Feb. 28, 1967 — J. C. WILSON — 3,305,974
GRINDING MACHINE
Filed Oct. 1, 1964 — 2 Sheets-Sheet 1
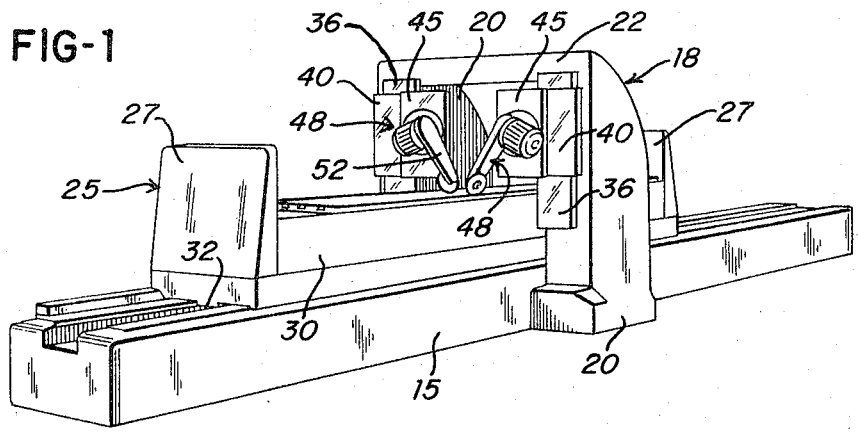
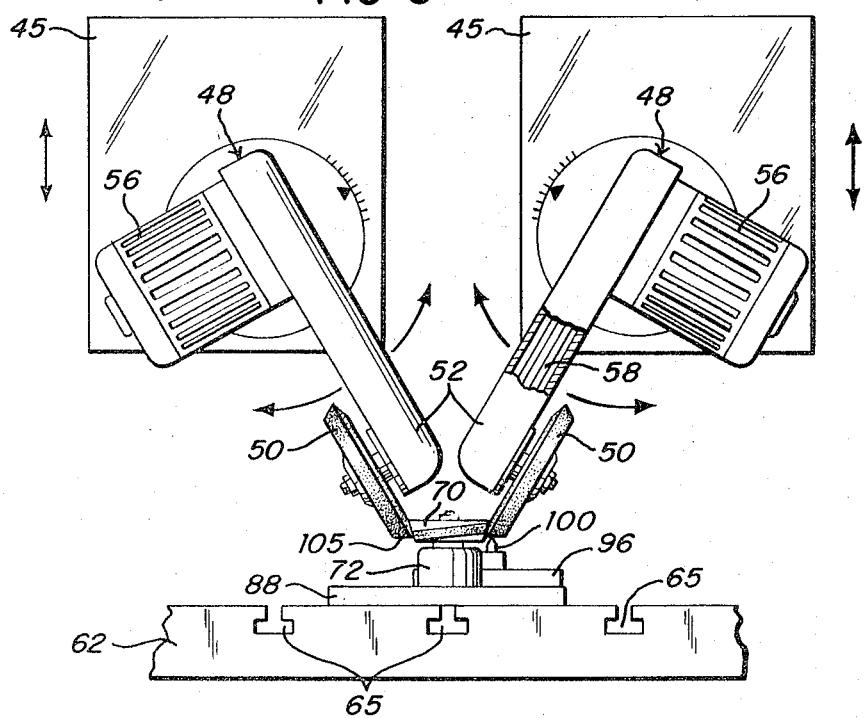
INVENTOR.
JOHN C. WILSON
BY Maréchal, Biebel, French & Bugg
ATTORNEYS Feb. 28, 1967 J. C. WILSON 3,305,974
GRINDING MACHINE
Filed Oct. 1, 1964 2 Sheets-Sheet 2
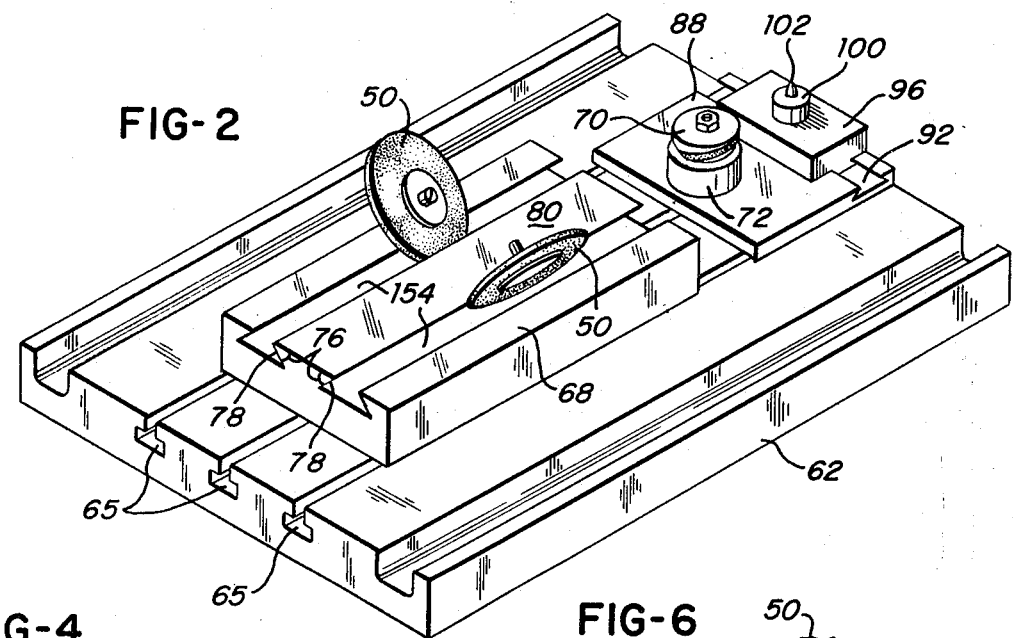
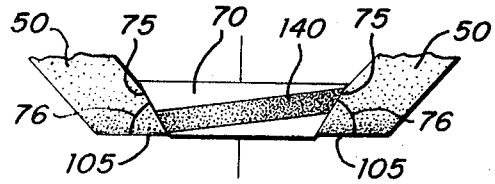
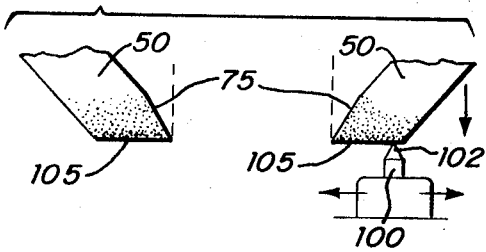
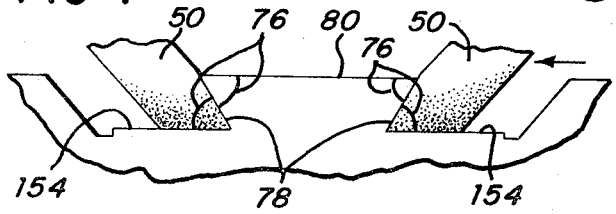
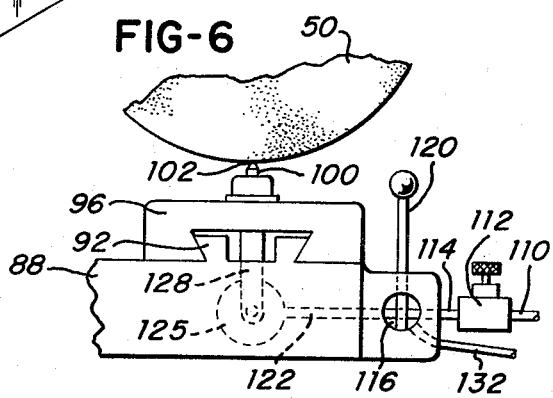
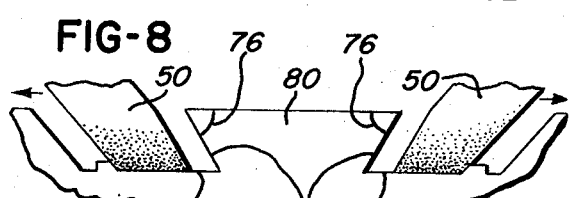
INVENTOR.
JOHN C. WILSON
BY Maréchal, Biebel, French & Bugg
ATTORNEYS "# United States Patent Office 3,305,974
Patented Feb. 28, 1967

3,305,974
GRINDING MACHINE
John C. Wilson, Springfield, Ohio, assignor to The Thompson Grinder Company, Springfield, Ohio, a corporation of Ohio
Filed Oct. 1, 1964, Ser. No. 400,683
5 Claims. (Cl. 51—5)

This invention relates to grinding machines, and more particularly, to a machine having a plurality of grinding wheels adaptable for grinding separate surfaces of a way and including an apparatus for accurately dressing the grinding wheels.

The invention is specifically adaptable as a way grinding machine where the way must be held within extremely close tolerances. Such tolerances are commonly required, for example, on dove-tail ways which may be used on machine tools where the guiding of one part in relation to another part must be accurate. For example, when a dove-tail way is employed on a machine tool as a guide way for the tool element, it is mandatory, for quality performance of the machine tool, that the dove-tail way be finished to extremely close tolerances in order that the tool element will accurately hold its predetermined relationship with the workpiece.

The present invention is directed to a machine which is adaptable for grinding simultaneously both sides of a way using a pair of grinding wheels which have been dressed as a matching set. As a result, the ways which are ground by the machine of the present invention may easily be held to close tolerances without the need for constantly gauging or checking the grinding wheel or workpiece.

Accordingly, a primary object of the invention is to provide a novel grinding machine which is adaptable for rapidly and economically grinding ways within close dimensional and surface finish tolerances.

As another object, the present invention provides a novel machine for grinding both sides of a way simultaneously, so that the sides are formed symmetrically relative to a reference plane.

A further object of the invention is to provide a grinding machine having a pair of grinding wheels, and a novel means for dressing the wheels to form mirror images of one another.

A further object of the present invention is to provide a grinding machine with a pair of adjustably mounted grinding wheels which are adaptable to grind simultaneously each side of a dove-tail way at identical angles.

Another object of the present invention is to provide a grinding machine with a novel apparatus for dressing a pair of grinding wheels, and which includes a power driven dressing roll having an obliquely spaced band of diamond cutters around its peripheral surface.

Still another object of the invention is to provide a novel way grinding machine having a pair of spaced grinding wheels and including a single power driven dressing roll which is positioned for dressing both grinding wheels along one corresponding grinding surface and a single traversing dressing tool for dressing both wheels along another corresponding grinding surface.

Other objects and advantages of the invention will be apparent from the following description, the accompanying drawings and the appended claims.

In the drawings—

FIG. 1 is a perspective view of a way grinding machine constructed in accordance with the invention;

FIG. 2 is a schematic perspective view of the work table, grinding wheels and dressing apparatus showing the relationship between these components and the workpiece placed on the table;

FIG. 3 is an elevational view of the pair of power driven grinding wheels showing the relationship between the grinding wheels and the dressing apparatus in accordance with the invention;

FIG. 4 is a fragmentary detailed view of the grinding wheels showing the dressing roll as it dresses the corresponding grinding surface of one of the grinding wheels, in accordance with the present invention;

FIG. 5 is a fragmentary detailed view of the grinding wheels showing the position of the traversing dressing tool as it dresses another corresponding grinding surface on each wheel;

FIG. 6 is an end elevational view of the traversing dressing tool and a fragmentary section of one of the grinding wheels showing the dressing position of the tool in relation to the grinding wheels;

FIG. 7 is a fragmentary detail view of the grinding wheels and workpiece showing the position of the grinding wheels while simultaneously grinding both sides of a dove-tail way in accordance with the invention; and FIG. 8 is a fragmentary detail view of the grinding wheels and the workpiece, in position as the grinding wheels finish simultaneously the coplanar surface on both sides of a dove-tail way, in accordance with the invention.

Referring to the drawings which illustrate a preferred embodiment of the invention, FIG. 1 shows a grinding machine which is preferably controlled by a suitable hydraulic system (not shown) and includes an elongated base 15 which normally rests upon the floor. Spaced transversely mid-way along the base 15 is an inverted U-shaped frame structure, generally referred to as 18, which includes a pair of columns 20 mounted rigidly to the sides of the base 15, and an integral overhead cross member 22 which joins the columns 20 together.

Mounted for reciprocating travel on the top side of the base 15 is a carriage 25 having end portions 27 which extend above a connecting bed portion 30. A guide way 32 is provided on the underneath side of the carriage 25 and a corresponding guide way (not shown) is provided on the base 15 in order to maintain the accurate alignment between the carriage 25 and the frame structure 18 as the carriage 25 reciprocates on the base 15.

Rigidly mounted to the upright columns 20 of the frame structure 18 are a pair of vertical guide members 36 which support a pair of horizontal guide members 40 adapted to move vertically on the vertical guide members 36, preferably under the control of a suitable hydraulic control mechanism. A pair of grinder support members 45 are mounted on the horizontal guide members 40 and are adapted to move horizontally, preferably driven by another suitable hydraulic control mechanism.

Adjustably mounted to the grinder support members 45, by a suitable rotatable mechanism, are a pair of power operated grinding heads, generally referred to as 48, which include a pair of grinding wheels 50 rotatably mounted on one end of a housing 52 which is fastened on the other end to a pair of electric motors 56. In addition to supporting the grinding wheels 50, the housing 52 also serves as a safetyguard for the drive belts 58 enclosed within the housing 52. Preferably, the grinding wheels 50 are adjustable through an angle of 180 degrees, in order to provide for versatility within the grinding machine, and thus enable the machine to be set up for grinding ways of many different configurations in addition to grinding right angle ways. For purposes of illustration, however, a dove-tail way is shown in the drawings.

Spaced below the grinding wheels 50 is a work table 62 which is rigidly mounted to the bed 30 of the carriage 25. The work table 62, as shown in FIGS. 2 and 3, includes a series of inverted T-shaped slots 65 which are commonly provided for the heads of tie-down bolts (not shown) which may be used to hold the workpiece 68 tightly to the work table 62 along with the use of suitable brackets and spacing blocks. Other types of retaining means may"

also be used, for example, a fixture or magnetic chuck may be mounted on the work table.

Adjustably mounted near one end of the carriage 25 and preferably on the end of the work table 62 is a tapered dressing roll 70 which is power driven by a suitable motor 72 and is adapted to engage the corresponding grinding surface 75 of each wheel 50 and dress these surfaces to the same angle 76 and spaced apart distance as desired between the sides 78 of the dove-tail way 80. Thus, the dressing roll 70 has the same tapered configuration as the dove-tail way. As shown, the motor 72 is rigidly mounted on a guide block 88 which is secured to the table 62.

Slidably mounted in the guide block 88 by means of a dove-tail guide way 92, is a tool support member 96 on which is mounted a single point dressing tool 100, preferably having a diamond point 102. The pointed dressing tool 100 is slidably mounted for traversing across the guide block 88 so that the tip 102 of the tool will move parallel with the work table 62 and will evenly and accurately dress the corresponding grinding surfaces 105 on both of the grinding wheels 50.

The dressing tool 100 is fed by suitable hydraulic control mechanism. A preferred mechanism is shown in FIG. 6, where a fluid, such as oil, is directed through a line 110 from a hydraulic pump (not shown) to a speed control valve 112. From this valve, a line 114 leads to a directional control valve 116 which is manually operated by a lever 120. Fluid lines 112 connect the control valve 116 to each end of a double-action linear motor 125 mounted within the guide block 88 for operating the linear feed of the tool support member 96 and dressing tool 100, through a connecting lever 128. Another line 132 leads from the directional control valve 116 to a suitable fluid storage tank which supplies the hydraulic pump.

Referring to FIG. 4, the dressing roll 70 preferably includes a band of diamond cutters 140 which is obliquely arranged on the peripheral surface of the dressing roll. This arrangement enables the diamond cutters to come into full contact with the corresponding grinding surface 75 of the grinding wheels 50 as the power driven dressing roll 70 is moved up to the bottom center of the wheels 50. By means of the independent hydraulic control systems for feeding the grinder support members 45 along the horizontal guide members 40, the grinding wheels 50 are brought into contact with the dressing roll 70, one at a time or simultaneously.

By power driving the dressing roll 70, it can be rotated considerably faster than the grinding wheels. Thus, the band of diamond cutters 140 can fully engage the entire corresponding grinding surface 75 of the grinding wheels 50 either separately or simultaneously in order to obtain a uniform and accurate dressing of each wheel. By this oblique arrangement of the diamond cutter 140, it is possible to accomplish the same accurate dressing of the grinding wheels with considerably fewer diamond cutters than would be required to cover completely the peripheral dressing surface of the dressing roll 70. Thus, a substantial economical advantage is accomplished by the above described arrangement of the diamond cutters 140 on the dressing roll 70.

From the above description, it will be seen that by the use of the dressing roll 70 and the traversing pointed dressing tool 100, the corresponding grinding surfaces 75 and 105 of both grinding wheels 50 receives exactly the same dressing treatment. As a result, the dove-tail way 80 is cut into the workpiece 68 with side walls 78 forming identically the same angle 76 with the top and bottom surfaces of the dove-tail way 80, assuming, of course, that the top surface of the workpiece 78 is parallel with the table 62. Likewise, if the way had parallel side walls, the walls would also form exactly the same angle with both the top and bottom surfaces of the way 80.

Referring to FIG. 5, the grinding wheels 50 are lowered to the diamond tip 102 of the dressing tool 100 by means of the hydraulic control systems which feed the horizontal guide members 40 along the vertical guide members 36. Preferably, the hydraulic control system for the two grinders 48 are suitably arranged so that both of the grinding wheels 50 may be moved vertically or horizontally together as a unit or may be moved independently. The diamond tip dressing tool 100 is directed traversely across the guide block 88 by the hydraulic control system, shown in FIG. 6, so that the diamond tip 102 passes along the bottom center of both grinding wheels 50 in a successive manner and thereby produces a pair of grinding wheels which have a corresponding grinding surface 105 which will precisely finish coplanar bottom surfaces 154 on both sides of the dove-tail way 80.

The detailed view of FIG. 7 shows the pair of grinding wheels 50 as they finish simultaneously both sides 78 of a dove-tail way 80 at an angle 76 which is identical to the angle described by the tapered dressing roll 70. The grinding wheels 50 are then separated horizontally to finish the coplanar bottom surfaces 154 adjacent the sides of the dove-tail way 80.

It therefore will be seen from the arrangement of the pair of grinding wheels 50 and their relationship with the dressing apparatus, as described above, that the present invention provides a novel machine for rapidly and accurately grinding dove-tail ways. The construction and arrangement of the dressing roll 70 and the single traversing dressing tool 100 provide an economical means for quickly dressing the pair of grinding wheels 50 to form a matching pair of grinding wheels which can grind simultaneously both sides of a way to exactly the same angle and dimension as the dressing roll. As a result, the machine, according to the invention, considerably reduces the time for accurately grinding ways into a workpiece. Furthermore, the power driven dressing roll with its included band of diamond cutters and the pointed traversing dressing tool provide a novel apparatus for dressing the grinding wheels as a matching pair.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A grinding machine adaptable for grinding simultaneously both sides of a way, said machine comprising, a base, a work table mounted for reciprocating movement in relation to said base, a pair of power driven grinding wheels adjustably supported above said table, each of said grinding wheels having two corresponding grinding surfaces, means connected to each said wheel forming an axis of rotation which is angularly adjustable in relation to said table, a dressing roll having an axis of rotation perpendicular to said table and mounted for reciprocating movement with said table for dressing one of said corresponding grinding surfaces on each of said wheels, and a second dressing tool mounted for traversing movement in relation to said table and adapted to dress the second of said corresponding grinding surfaces on each of said wheels.

2. A grinding machine adapted for grinding ways and the like, said machine comprising a base, a pair of power grinding wheels adjustably supported above said base and adapted to grind simultaneously both sides of a way, a horizontal work table mounted on said base for reciprocating motion to carry a workpiece thereon past said wheels, said grinding wheels each including a plurality of corresponding grinding surfaces operable simultaneously on the workpiece, means defining an axis of rotation for each of said wheels which are angularly adjustable to each other, a power driven dressing roll mounted for movement with said table and adapted to dress one of said corresponding grinding surfaces on each of said wheels, said dressing roll having an obliquely arranged band of diamond cutters spaced around its peripheral surface, and a second dressing tool mounted for movement transversely of said table and arranged to dress another of said corresponding grinding surfaces on each of said wheels.

3. In a grinding machine adaptable for grinding simultaneously both sides of a way or the like, said machine comprising a base, a pair of power driven grinding wheels adjustably supported above said base and including corresponding grinding surfaces, means forming axis of rotation for each of said wheels which are angularly adjustable to each other, a horizontally movable work table spaced below said wheels and adapted to reciprocate on said base for carrying a workpiece past said wheels for simultaneous grinding of complementary surfaces on said workpiece, a dressing roll having an axis of rotation perpendicular to said table and mounted for movement with said work table to be carried to the bottom center between said wheels, and a power drive means for rotating said roll simultaneously to dress said corresponding grinding surfaces on said grinding wheels.

4. A grinding machine as defined in claim 3, wherein said power driven dressing roll includes a tapered dressing surface for dressing said wheels in complementary fashion to the same angular and spaced apart relationship as the surfaces to be formed on the workpiece.

5. A grinding machine adaptable for grinding dovetail ways, said machine comprising, a base, a work table mounted for reciprocating movement in relation to said base and including means to mount a workpiece, a pair of power driven grinding wheels adjustably supported above said table, each of said grinding wheels having two corresponding grinding surfaces for forming simultaneously four related surfaces on said workpiece, means defining an axis of rotation for each of said wheels disposed in angular relationship with said table, a power driven tapered dressing roll having an axis of rotation extending perpendicularly to said table, means for moving said roll to the centerline of said wheels for dressing one of said corresponding grinding surfaces on each of said wheels, and a pointed dressing tool mounted for traversing movement in relation to said table and arranged to dress the second of said corresponding grinding surfaces on each of said wheels.

References Cited by the Examiner
UNITED STATES PATENTS

| | | | |
|---|---|---|---|
| 1,870,764 | 8/1932 | Aeppli | 51—113 X |
| 2,456,762 | 12/1948 | Wilson | 125—11 |
| 2,585,990 | 2/1952 | Baldenhofer | 51—5 X |
| 2,730,848 | 1/1956 | Wallace | 125—11 X |

HAROLD D. WHITEHEAD, *Primary Examiner.*